April 28, 1970     C. H. WALDHAUER, JR     3,508,833

AIM ASSESSMENT APPARATUS

Filed Jan. 11, 1967

INVENTOR.
CHARLES H. WALDHAUER

BY Charles J. Ungemach

ATTORNEY

United States Patent Office 3,508,833
Patented Apr. 28, 1970

3,508,833
AIM ASSESSMENT APPARATUS
Charles H. Waldhauer, Jr., Glendora, Calif., assignor to Honeywell Inc., Minneapolis, Minn., a corporation of Delaware
Filed Jan. 11, 1967, Ser. No. 608,662
Int. Cl. G01b 11/26
U.S. Cl. 356—152                               4 Claims

ABSTRACT OF THE DISCLOSURE

This disclosure describes an optical system for evaluating how well a simulated weapon is pointed at a target. Radiation from a light source mounted on the target enters the optical system and passes through to a detector for a predetermined percentage of the time, which percentage depends on the incident angle of the radiation with respect to the optical axis of the optical system. Whether or not the radiation passes through to the detector is dependent upon the instantaneous size of a variable aperture which continuously varies or oscillates in a predetermined manner.

BACKGROUND OF THE INVENTION

The present invention pertains to optical apparatus and more particularly to an aim assessment device for use, for example, in training with simulated weapons. It should be clear from the following description and drawings that the apparatus disclosed herein may be utilized in many applications where it is desired to determine the direction of a source of radiation.

For safety and economy it is often advantageous to train personnel with simulated weapon systems. It is further desirable to have some immediate indication of the accuracy with which the simulated weapon is being fired. For example, if a trainee aims and fires a cannon toward a target it is desirable to have an instant indication of whether or not he pointed the weapon correctly so as to hit the target so that a simulated explosion may be caused on the target to indicate a hit. In the prior art, optical systems have been used which receive radiation from a light source on the target. Radiation passes through the optical system and impinges on different detectors, the detector actuated being dependent upon how accurately the optical system is pointed at the target. Thus, the different detectors may correspond to a direct hit, a near miss, a total miss etc. The disadvantage of this sort of system is that in the real situation a near miss is sometimes effective to destroy the target and sometimes not. Consequently, it would be more realistic to have a system in which the target was destroyed with all direct hits and with some of the near misses. The present invention provides apparatus to achieve this result.

SUMMARY OF THE INVENTION

Briefly the present invention comprises an optical system attached to the simulated weapon and adapted to receive radiation from a source mounted on the target. A variable aperture in the applicant's system becomes larger and smaller that is, it oscillates in size, so as to always pass radiation which is directly along the optical axis but only pass radiation which is slightly off the optical axis a predetermined percentage of the time. A single detector receives the radiation and signals a hit every time that the weapon is pointed correctly and some of the times that the simulated weapon is pointed nearly correctly. Consequently, it is an object of the present invention to provide an improved optical direction measuring device. A further object of my invention is to provide an improved aim assessment device for use with simulated weapons. Other objects and advantages will become apparent to those skilled in the art upon consideration of the following description and drawings.

DESCRIPTION OF THE PREFERRED EMBODIMENT

Figure 1:
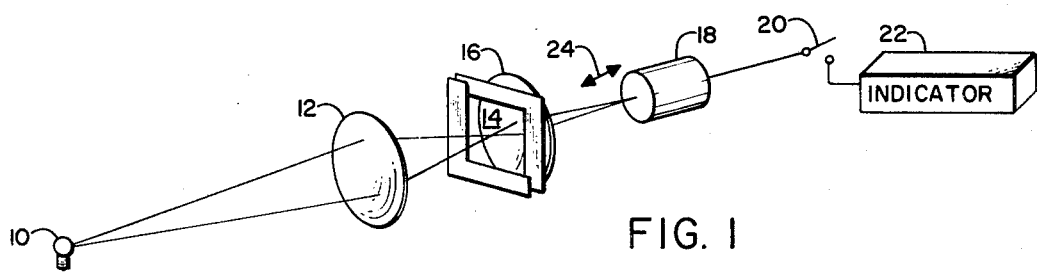
FIGURE 1 is a schematic perspective diagram showing generally the arrangement of major elements in the present invention.

In FIGURE 1 the target is represented by a source of radiation 10 which may be an infrared source, an ultraviolet source or any other suitable radiation producing means which can be mounted on the target. Radiation from the target passes through a lens 12, a variable aperture generally indicated by the numeral 14, a lens 16 and impinges on a detector 18. The signal from detector 18 is routed through a trigger 20 to an indicator 22. The two right angle frames which comprises the variable aperture 14 are adapted to oscillate in the direction shown by an arrow 24. The means for effecting this oscillation will be more fully described hereinafter with reference to FIGURE 3.

Figure 2:
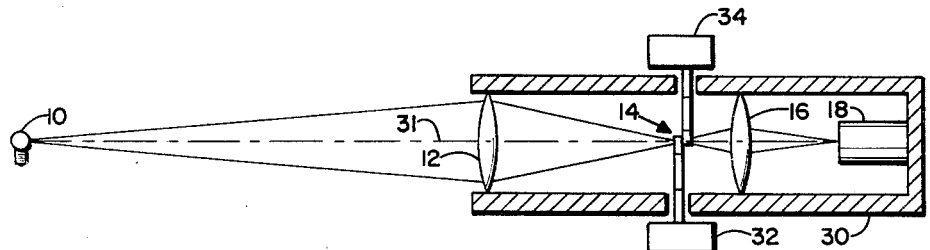
FIGURE 2 is a side view of the apparatus of FIGURE 1 further clarifying the arrangement of components in my invention.

Referring to FIGURE 2 the source 10, lens 12, variable aperture 14, lens 16, and detector 18 are shown in a possible mounting within a housing 30. All of the optical components are centered on an axis 31. The means for effecting the opening and closing of the variable aperture are schematically shown as a pair of boxes 32, and 34. From FIGURES 1 and 2 it is clear that when the optical system is aligned with the source 10 radiation passes directly through the center of aperture 14 so that when trigger 20 is actuated indicator 22 will indicate that radiation is being received by detector 18, or that the simulated weapon has scored a hit. Although aperture slideably oscillates in size, it never completely closes so that radiation directly in the center always passes through to detector 18. The minimum opening of the aperture determines the ranges of pointing which will always be considered a direct hit.

If, however, the source 10 is far enough off the optical axis 31 of lenses 12 and 16 so as to be in a "near miss" area the area the radiation will pass through only when the aperture is sufficiently large enough to allow the passage of radiation thereby. Consequently it may be seen that aperture 14 may be opened and closed in a predetermined manner so as to allow near miss radiation to pass through in a random manner for a certain predetermined percentage of the time.

In this way when trigger 20 is closed if source 10 is not directly in line with the optical system indicator 22 may or may not receive a signal from detector 18 so that a hit may or may not be recorded. It is clear that the optical apparatus described in FIGURES 1 and 2 may be fastened to any type of weapon to evaluate the accuracy with which it has been aimed. It will also be obvious to those skilled in the art that various types of variable apertures may be used in the present invention. However, a preferred embodiment of the variable aperture mechanism is shown in FIGURE 3.

Figure 3:
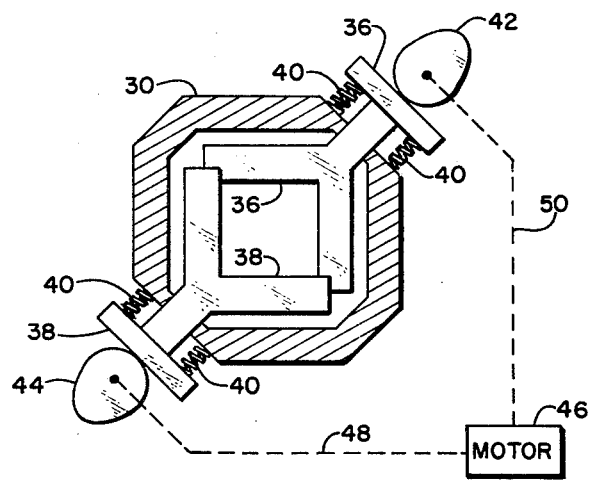
FIGURE 3 is a detailed schematic view of a possible arrangement of apparatus to provide the variable aperture in the present invention.

In FIGURE 3, housing 30 is shown in section. A pair of frames 36 and 38 are slideably positioned in housing 30 so as to form an aperture therein of substantially square shape. The aperture formed by frames 36 and 38 is biased toward a maximum open position by a set of springs 40.

The frames 36 and 38 are periodically moved toward each other by means of a pair of cams 42, and 44, which cams are synchronously driven by a motor 46 through suitable mechanical connections indicated as dash lines 48 and 50. Cams 42 and 44 have a relatively simple shape, as described, causing an oscillation of the aperture size. However, cams 42 and 44 may be made as complicated as desired. For example, the cams could be designed to hold frames 36 and 38 sufficiently close together to pass radiation on the optical axis and up to 1° off the optical axis for 75% of the time. The cams could then quickly allow frames 36 and 38 to separate so as to allow any radiation up to 4° off of the optical axis for the remaining 25% of the time. The above figures are purely exemplary since the actual aim assessment profile would be dependent on the particular weapon which is being simulated.

It is evident that various modifications may be made to the apparatus disclosed herein without departing from the spirit and scope of the invention. Consequently, I do not intend the present invention to be limited to the particular embodiment and apparatus shown in the drawing except as defined by the appended claims.

I claim:

1. In apparatus for evaluating the accuracy with which a member is pointed at an object the combination of:
   first optical means having an optical axis and positioned on the member so as to accept radiation from a radiation source located on the object and direct said radiation generally to a plane;
   variable aperture means in said plane attached to the member;
   detecting means operable to detect radiation from said first optical means passed by said variable aperture means;
   means for varying said aperture in a predetermined manner so that said aperture passes radiation which enters said first optical means from a point on the optical axis and passes radiation which enters said first optical means from a point off of the optical axis for only a predetermined percentage of the time; and
   indicator means connected to said detecting means for indicating when radiation is received by said detecting means.

2. The apparatus of claim 1 in which said variable aperture means comprises a plurality of members forming a quadrangular aperture which is operable in accordance with said varying means to expand and contract in size.

3. The apparatus of claim 2 in which said plurality of members comprises two frames slideably positioned adjacent each other so as to form such quadrangular frame, and each frame forming half of said quadrangular frame; and
   said varying means comprises means to oscillate said two frames toward and away from each other so as to vary the aperture in a predetermined manner.

4. Apparatus for evaluating the accuracy with which a simulated weapon is aimed at a target:
   first optical means positioned on the simulated weapon so as to accept radiation from a radiation source located on the target and direct said radiation generally to a plane;
   variable aperture means in said plane attached to the simulated weapon;
   detecting means operable to detect radiation from said first optical means passed by said variable aperture means;
   means for varying said aperture means in a predetermined manner so that said aperture always passes radiation which enters said first optical means along the optical axis of the simulated weapon and only passes for a predetermined percentage of time, radiation which enters said first optical means from a target displaced from the optical axis; and
   indicator means connected to said detector means, said indicator means operable to produce a hit indication when radiation is passed by said variable aperture means.

References Cited

UNITED STATES PATENTS

| 2,016,025 | 10/1935 | Scribner et al. | 250—203 |
| 2,995,694 | 8/1961 | Sorkin et al. | 356—141 |

RONALD L. WIBERT, Primary Examiner

T. R. MOHR, Assistant Examiner

U.S. Cl. X.R.
356—138